Aug. 7, 1973     F. A. PRAHL, JR., ET AL     3,751,540
METHOD OF MAKING A MOLD FOR REPRODUCING PARTS OF
SHOES AND THE LIKE
Filed Aug. 19, 1971                    4 Sheets-Sheet 3

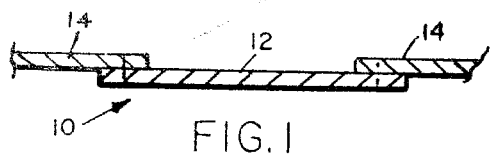
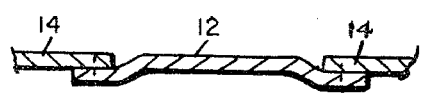
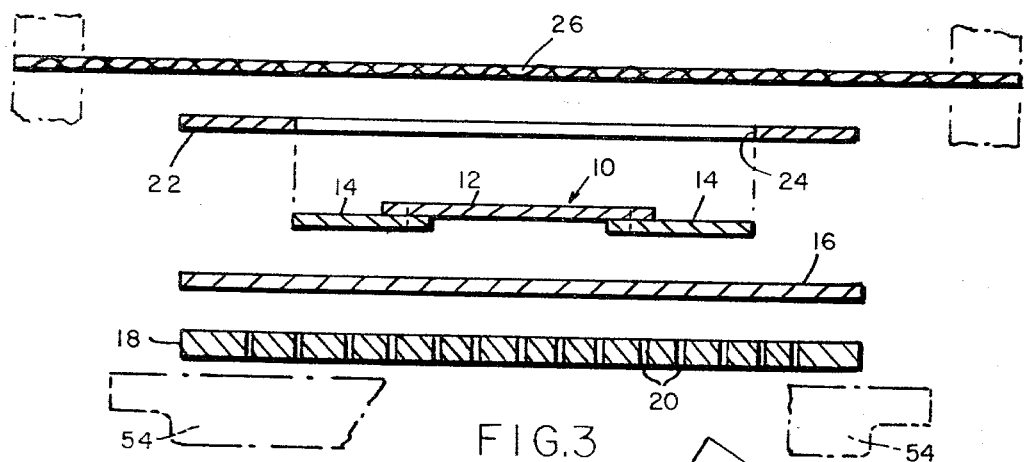
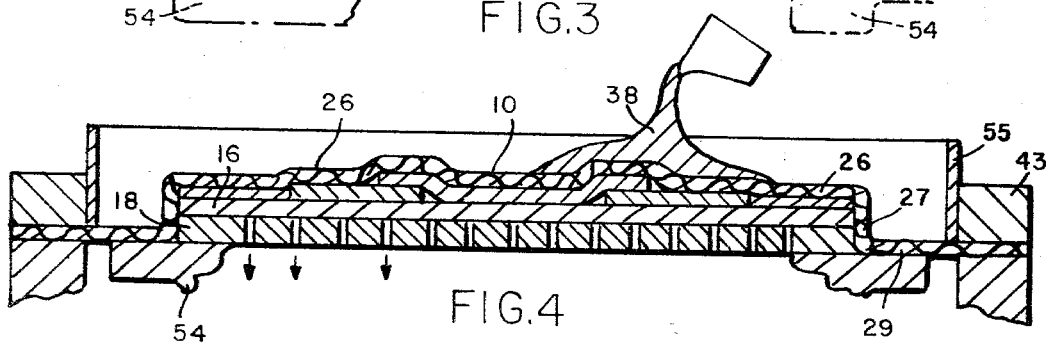
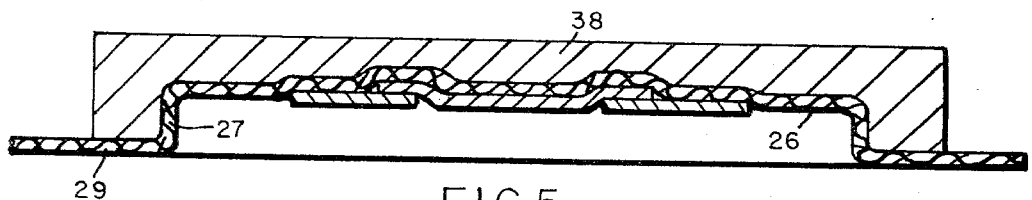
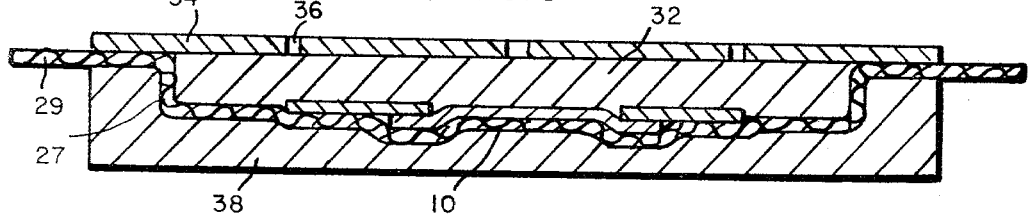

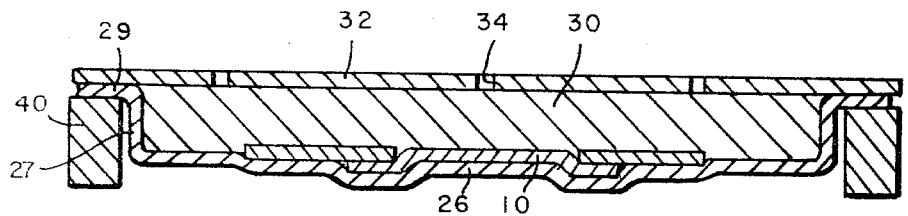
FIG.11
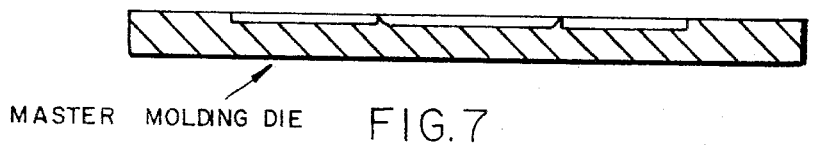
MASTER MOLDING DIE     FIG.7
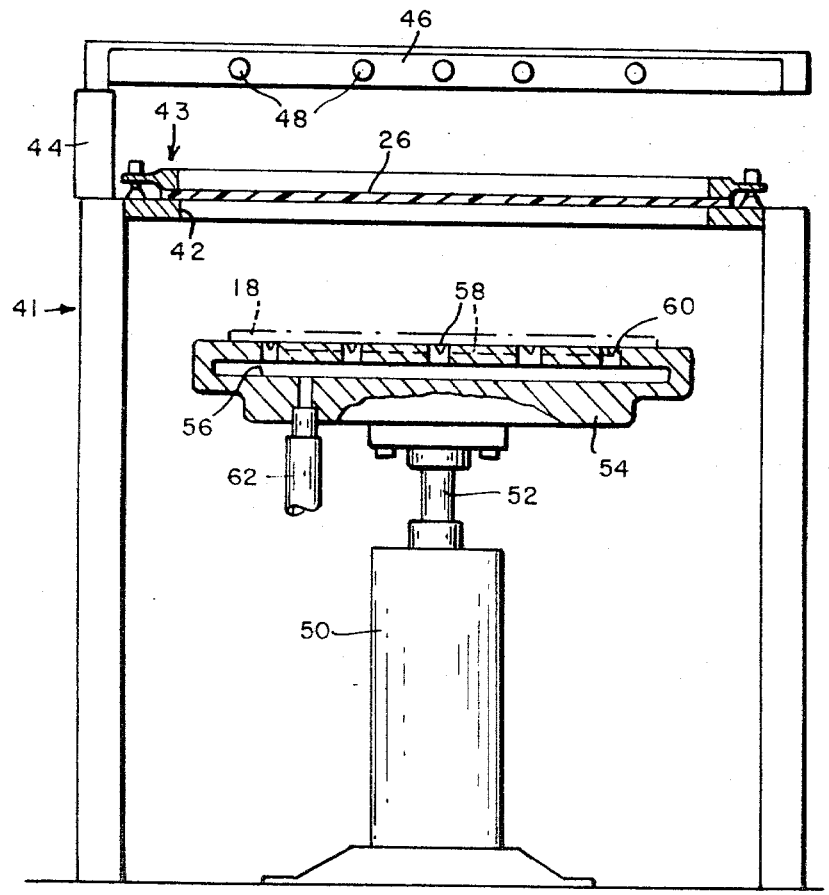
FIG.16

United States Patent Office 3,751,540
Patented Aug. 7, 1973

3,751,540
METHOD OF MAKING A MOLD FOR REPRODUCING PARTS OF SHOES AND THE LIKE
Frederick A. Prahl, Jr., Carlisle, and Robert B. Dunlap, Medway, Mass., assignors to Compo Industries, Inc., Waltham, Mass.
Filed Aug. 19, 1971, Ser. No. 173,072
Int. Cl. B29c 1/02
U.S. Cl. 264—90             12 Claims

ABSTRACT OF THE DISCLOSURE

The method of making a master mold for reproducing parts having raised portions on its face comprising providing a master pattern of the part to be reproduced, positioning the master pattern within a mask on a supporting surface, displacing the elevated portions at the face of the master pattern into a substantially common plane, forming a rigid structure across the back of the master pattern and mask, about the peripheral edge of the mask and forwardly of the plane of the master pattern to provide a cavity at the forward side of the master pattern, removing the mask from the rigid structure, flooding the cavity with a curable liquid material having a lower dielectric constant than the thermoplastic of which the part is to be reproduced to a predetermined depth which is greater than the thickness of the projecting portion, causing the liquid material to cure and then stripping the cured material representing the mold from the rigid structure.

BACKGROUND OF THE INVENTION

Making molds from a master pattern for use in reproducing an exact imitation of the master pattern on sheet material, for example, thermoplastic sheet material is not new and generally comprises carefully preparing a master pattern, applying a liquid material to the master pattern, allowing it to set and then stripping it from the master pattern. Silicone rubber is the preferred material because it takes the configuration of the master pattern in intimate detail and when cured may be easily stripped from the master pattern without need for parting compounds. In making such molds the cavity must correspond substantially in depth to the thickness of the sheet material which is to be molded otherwise the molding pressure will not force the surface of the sheet thermoplastic into intimate engagement with the bottom of the mold cavity so that only an imperfect reproduction will be produced. This makes it necessary when attempting to reproduce surfaces which have different elevations and levels by reason of overlapping parts, seams, stitching, cut-outs and the like to carefully and painstakingly prepare the master pattern by splitting heavy leathers and skiving overlapping parts to try to obtain a substantially uniform overall thickness corresponding substantially to the thickness of the thermoplastic material to be molded from which to make the mold. This requires skill and consumes an abnormal amount of shoe making time since a relatively large number of molds are made for the foregoing purposes, each being prepared, of course, according to the style of shoe upper to be made. The purpose of this invention is to eliminate the foregoing by an improved technique which enables making the mold from the master pattern to a uniform depth corresponding substantially to that of the thermoplastic sheet which is to be molded independently of the thickness of the material of the master pattern and/or differences in thickness thereof by reason of overlays, seams, stitching, perforations and the like and which provides for a simple, quick and relatively inexpensive way of making molds which will produce an exact imitation of the configuration of the master mold.

SUMMARY

As herein illustrated, the method comprises displacing the elevated portions at the face of a master pattern which is to be reproduced into a substantially common plane, supporting the master pattern within a mat with the face projecting above the surface thereof an amount corresponding substantially to the thickness of the part to be made, flooding the portion of the master pattern projecting from the mat with a curable liquid material having a lower dielectric constant than the thermoplastic of which the part is to be reproduced to a predetermined depth which is greater than the thickness of the projecting portion of the master pattern, causing the liquid material to cure and then stripping the cured material from the master pattern and surrounding mat.

According to the preferred procedure, the displacement of the raised portions of the master pattern is effected by mounting the master pattern face down on a slightly resilient layer of sheet material supported on a rigid platen, placing a mask about the master pattern, bringing a sheet of flexible substantially impervious material into engagement with the back side of the master pattern, applying a vacuum through holes in the platen to the face of the master pattern to displace the raised portions on the face rearwardly into the sheet of flexible material to a depth such that the portion of the master pattern projecting from the face of the flexible sheet corresponds substantially to the thickness of the mask and, while holding the master pattern embedded within the sheet of flexible material, applying a layer of quick-setting material to the back of the flexible sheet, for example, plaster of Paris and allowing it to solidify to form a rigid backing. The mask is now removed and the rigidly backed master pattern is supported with the master pattern facing upwardly whereupon the surface of the master pattern and the surrounding backing are flooded to a uniformly controlled depth with a room-temperature curing silicone rubber. After the silicone rubber has cured it is stripped from the surface of the master pattern and constitutes the master molding die.

Alternatively, the displacement of the raised portions of the master pattern is effected by mounting the master pattern face down on a slightly resilient layer of sheet material supported on a rigid platen, placing a mask about the master pattern, bringing a softened sheet of substantially impervious plastic material into engagement with the back side of the master pattern and applying a vacuum through the rigid platen to the face to displace the raised portions on the face rearwardly into the plastic sheet and to embed the master pattern in the plastic sheet to a depth such that the portion projecting from the face of the plastic sheet corresponds substantially to the thickness of the mask. Having effected this displacement the plastic sheet is restored to its rigid condition. The rigid sheet of plastic with the master pattern embedded therein is now placed with the master pattern facing upwardly, is shimmed from the underside, if necessary, to produce a substantially perfectly level surface and then flooded to a uniformly controlled depth with a room-temperature curing silicone rubber. Following curing the silicone is stripped from the master pattern and constitutes the formed mold.

According to still another procedure, the master pattern which is to be reproduced is placed with its rear side in engagement with a sheet of wax or similar impressionable material of larger area whereupon the master pattern is pressed into the wax sheet in such fashion as to force the raised portions of its surface into a substantially common plane and to embed the master pattern in the wax sheet so that the surrounding wax sheet becomes a supporting mat for the mastern pattern. The master pattern may be pressed into the surface of the wax so that only the face projects therefrom by the amount corresponding to the thickness of the part to be made or a mask of that thickness may be placed on the wax sheet above the master pattern. Usually an adhesive is employed between the master pattern and the wax to effect adhesion. The composite structure comprising the master pattern with the wax backing is then supported with the master pattern facing upwardly whereupon the surface of the master pattern and the surrounding mat is flooded with liquid silicone rubber as related above, the silicone rubber allowed to cure while constituted to a uniform depth and when cured removed by stripping it from the master pattern. Instead of using a continuous sheet of wax, strips of wax may be applied to the rear side of the master pattern to the areas which require filling following flattening of the raised portions so as to produce a substantially flat surface on the face of the master pattern.

The invention will now be described in greater detail with reference to the accompanying drawings wherein:

FIG. 1 is a fragmentary section of the master pattern of the shoe part which is to be reproduced, which has raised portions on its surface by reason of overlapping parts;

FIG. 2 shows the relation of the surfaces at the face of the master pattern achieved by flattening;

Figure 8:
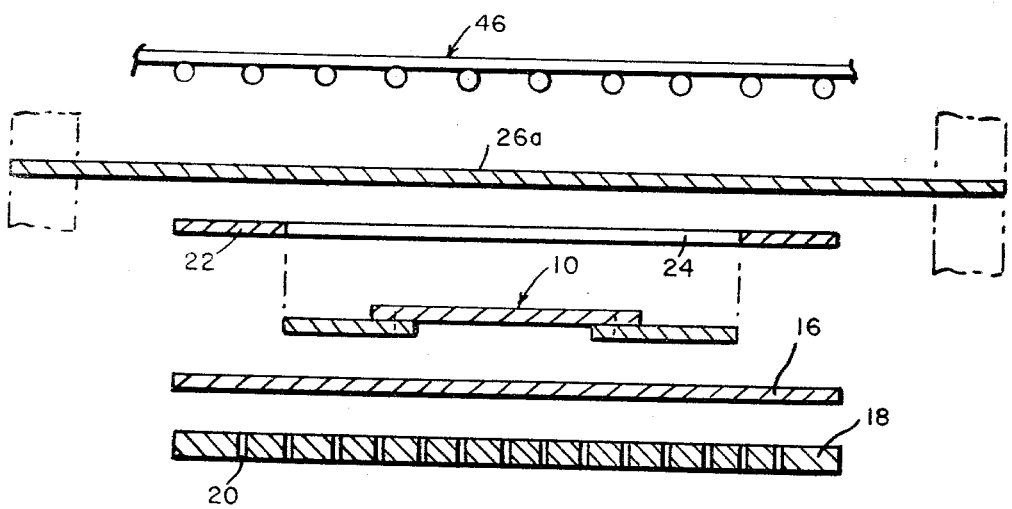
Figure 9:
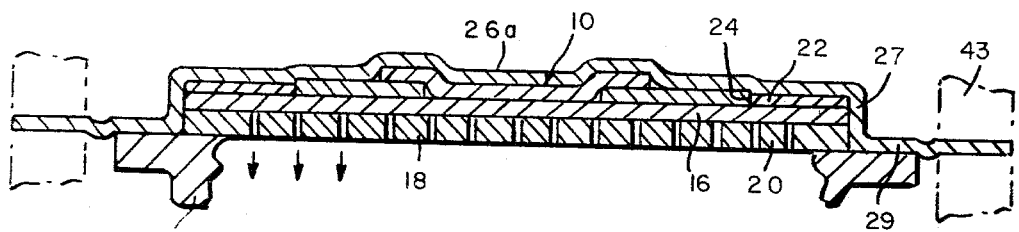
Figure 10:
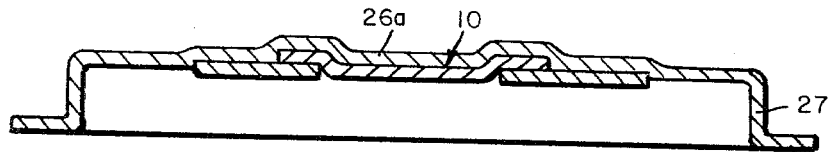
Figure 12:
Figure 14:
Figure 13:
Figure 15:
Figure 17:
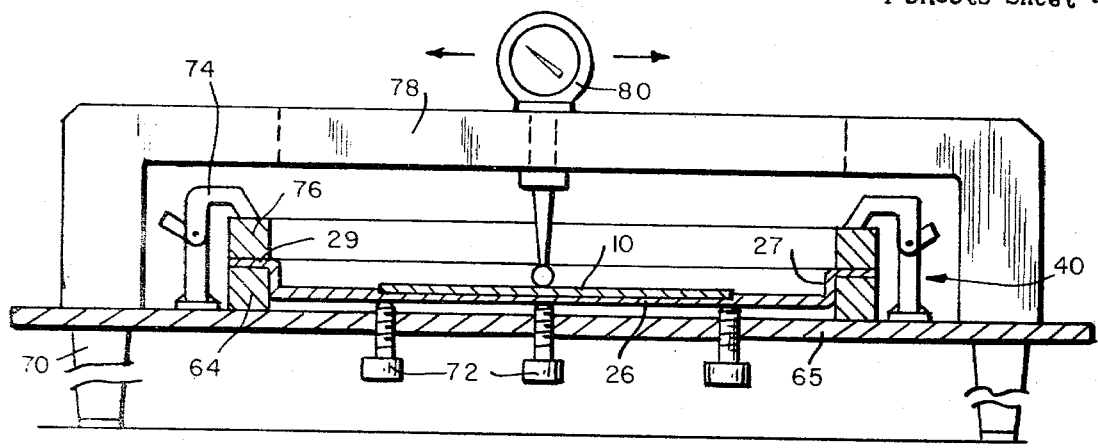
Figure 19:
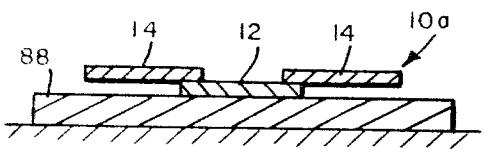
Figure 20:
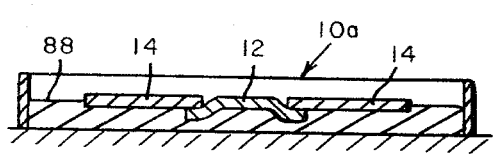
Figure 21:
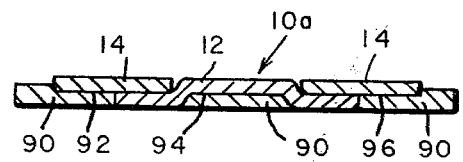
Figure 18:
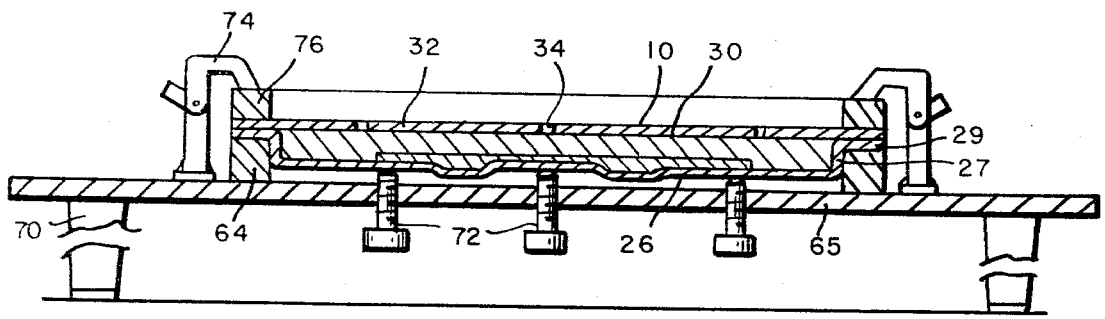

FIG. 3 diagrammatically illustrates the preferred procedure for flattening the master pattern and embedding it in a supporting mat, prior to such flattening;

FIG. 4 shows the flattening of the master pattern preparatory to application of a rigid, supporting backing thereto of a quick-setting material which will form a rigid structure, for example, plastic of Paris;

FIG. 5 shows the master pattern embedded in the rigid, plaster of Paris backing with the mask removed and with its face projecting therefrom an amount corresponding substantially to the depth of the mold to be made;

FIG. 6 shows the master pattern in the plaster of Paris backing with the master pattern facing upwardly therefrom and flooded with room-temperature, curable, silicone rubber;

FIG. 7 shows the completed master mold stripped from the master pattern;

FIG. 8 diagrammatically illustrates an alternative procedure for flattening the master pattern and embedding it in a rigid supporting backing comprised of a sheet of a normally rigid plastic, prior to such flattening;

FIG. 9 shows the flattened master pattern in engagement with the softened plastic backing sheet;

FIG. 10 shows the mastern pattern embedded in the plastic backing sheet after hardening with the mask removed and with its face projecting therefrom an amount corresponding substantially to the depth of the mold to be made;

FIG. 11 shows the supporting plastic backing sheet supported with the master pattern facing upwardly with its face flooded with room-temperature silicone rubber;

FIG. 12 shows a fragmentary section of the shoe upper or other article with a raised portion comprising, for example, an overlay;

FIG. 13 shows the desired displacement of the overlay into the face to provide for a substantially flat surface;

FIG. 14 shows a section of a shoe upper or other article provided with seams;

FIG. 15 shows the displacement of the seams into the surface to provide a substantially flat surface;

FIG. 16 is an elevation of an apparatus for embedding the master pattern in a mat according to either of the procedures illustrated in FIGS. 3 to 5 or FIGS. 8 to 10;

FIG. 17 is an elevation, partly in section, of an apparatus for supporting the plastic backing with the master pattern in an upwardly facing position specifically illustrating the leveling process;

FIG. 18 shows the flooding of the surface of the master pattern with silicone rubber; and FIGS. 19, 20 and 21 illustrate alternative methods by means of which the raised portions are manually displaced to form supporting structures for master patterns from which master molds may be made.

According to the preferred method of making the mold a master pattern of the part to be reproduced, such as shown at 10 (FIG. 1) comprising a component 12 and overlapping components 14—14 is placed face down (FIG. 4) upon a sheet of slightly resilient material 16 resting on a rigid metal plate 18 containing perforations 20, the latter in turn resting on a supporting platen 54. A mask 22 of greater area than the master pattern and containing an opening 24 corresponding in configuration to the peripheral edge of the part is placed over the master pattern so that it rests on the sheet of resilient material 16. The assembly comprising the resilient material 16, the metal plate 18, the master pattern 10 and the mask 22 is then brought into juxtaposition with a thin flexible sheet of impervious material 26 of greater area than the mask and a vacuum is applied to the underside of the metal plate 18. As a result of the application of the vacuum to the face of the master pattern the component portion 12 on the face is displaced downwardly so that its surface lies substantially in the same plane as the surfaces of the portions 14—14, as shown in FIGS. 2 and 4—the rearwardly displaced portions being taken up in the impervious sheet. The vacuum draws the impervious sheet about the back side of the master pattern against the mask, and about the edges of the resilient material 16 and plate 18 into engagement with the supporting platen 54 embedding the master pattern in the sheet and forming a surrounding wall 27 and flange 29 around the master pattern. In order to ensure a good bond between the back side of the master pattern and the impervious sheet it is desirable to apply an ahesive to the back side of the master pattern.

While the master pattern is held embedded in the impervious sheet as shown in FIG. 4, a relatively thick layer of quick-setting material which when hardened will form a rigid structure such as plaster of Paris 38 is applied to the rear side of the impervious sheet and allowed to harden. If desired, an adhesive may be applied to the rear surface of the impervious sheet prior to the application of the plaster of Paris. The impervious sheet employed may be comprised of a relatively thin openmesh woven fabric, coated on one side, such as oil cloth or its equivalent.

After the plaster of Paris is hardened the vacuum is released, the platen lowered and the rigid plaster of Paris backed sheet with the master pattern embedded in it unclamped and removed. The mask is now removed leaving the master pattern projecting from the surface of the surrounding plaster of Paris backed sheet.

According to the method herein illustrated, the metal plate 18 and the resilient sheet 16 have a combined thickness corresponding to the ultimate thickness desired at the bottom of the mold to be formed so that when the impervious sheet material is drawn about the edges of the master pattern, the mask, the resilient sheet and the plate and backed by the plaster of Paris, the resulting mat has a surrounding wall 27 terminating in a flange 29 providing a cavity surrounding the master pattern, the depth of which from the face of the master pattern to the flange corresponds to the aforesaid desired thickness for the mold bottom. By thus predetermining and controlling the depth of the cavity relative to the face of the mat a uniform thickness may be assured for the bottom of the mold and hence uniform dielectric characteristics throughout the bottom of the mold over the entire area of the mold surface.

The plaster of Paris backing, which forms a supporting mat for the master pattern, is now employed to support the master pattern facing upwardly as shown in FIG. 6, whereupon a curable liquid material 32 having a lower dielectric constant than the thermoplastic of which the part is to be reproduced is poured into the cavity to completely fill it, covering the upper surface of the master pattern 10 to a depth corresponding to the depth of the cavity whereupon a plate 34 containing holes 36 is placed on the flange 29 of the upper edge of the wall 27 to confine the liquid material during curing. In accordance with customary practice an excess of liquid 32 is poured into the cavity so that when the plate 34 is placed against the flange to cover the cavity enough pressure is applied to level the material within the cavity and to cause such excess as there is to rise in the holes within the cover plate 34. This ensures uniform depth and hence the uniform thickness desirable. After curing any of the excess cured material which extrudes through the riser holes is cut off, the plate removed and any nubs on the surface of the mat carefully removed. The resulting cured structure comprises the master mold as shown in FIG. 7.

Alternatively, the method comprises, as shown in FIGS. 8, 9 and 10, placing the master pattern 10 face down on a sheet of resilient material 16 resting on a rigid metal plate 18 containing perforations 20, placing a mask 22 of greater area than the master pattern and containing an opening 24 corresponding in configuration to the peripheral edge of the master pattern on the sheet of resilient material 16 and then raising the assembly into juxtaposition with a softened sheet of plastic 26a of greater area than the mask and applying a vacuum to the underside of the metal plate through the openings 20. The plastic sheet is softened by a heating grid 46. Application of the vacuum to the face of the master pattern displaces the raised portions rearwardly so that the surface lies substantially in the same plane, the rearwardly displaced portions being taken up in the plastic sheet. The vacuum embeds the back side of the master pattern and draws the sheet about the edges of the master pattern, mask, resilient sheet and plate into engagement with the supporting platen forming, as related above, a surrounding wall 27 and flange 29 defining an open-top cavity around the master pattern.

Following application of the vacuum to draw the softened sheet plastic about the master pattern and while the vacuum is held and upon cooling, the softened plastic sheet is restored to its rigid condition whereupon the mask is removed, leaving the master pattern embedded in the rigid sheet surrounded by the extending portion of the sheet which comprises a supporting mat, as shown in FIG. 10.

In order to ensure good bonding between the back side of the master pattern and the plastic sheet, it is desirable to apply an adhesive to the back side of the master pattern which is compatible with the plastic sheet.

Instead of applying a vacuum to the face of the master pattern, air pressure may be applied to the back of the mat to effect flattening.

The mat is now employed to support the master pattern 10 facing upwardly, as shown in FIG. 11, on a support 40 whereupon a curable, liquid material 30 having a lower dielectric constant than the thermoplastic of which the part is to be reproduced is poured into the cavity to completely fill the cavity and cover the upper surface of the master pattern 10 to a depth corresponding to the depth of the cavity whereupon a flat plate 32 containing holes 34 is placed on the flange 29 surrounding the wall 27 to constrain the liquid material while curing. When the liquid material is cured the plate 32 is removed, the cured material is stripped from the surface of the master pattern and the surrounding mat and comprises, as shown in FIG. 7, a completed master mold. The holes in the plate provide risers through which the excess liquid material may expand during curing and the nubs formed in these risers are removed to provide a perfectly flat back surface.

In the manufacture of the mold for reproducing parts of sheet thermoplastic, it is desirable that the mold cavity be of somewhat lesser depth than the thickness of the material being molded. Accordingly, the mask 22 is comprised of a material which is somewhat less than the thickness of the part to be molded so that when the master pattern becomes embedded in the backing sheet with the plaster of Paris, the plaster not only embeds the rearwardly displaced portions but also the portions of the peripheral edge projecting rearwardly from the mask, leaving a portion projecting from the face of the mat which corresponds to the thickness of the mask which, as related above, is comprised of a material, the thickness of which is slightly less than the thickness of the thermoplastic sheet material of which the part is to be molded so that the mold cavity will have a depth less than the thickness of the part to be molded.

FIGS. 12, 13, 14 and 15 show examples of parts having raised areas which may be treated in the foregoing fashion; FIG. 12, for example, comprising an overlay and FIG. 14 seams. Other surface projections may take the form of stitches, appliques, perforations, bindings, eyelet stays, grain and the like.

The molding die made according to either procedure may be used for reproducing parts from thermoplastic sheet materials, but preferably is used as a master mold from which a production mold is made comprised of a material which has a greater resistance to wear than the silicone rubber of which the master mold is comprised. To this end, a negative of the master mold is made and from this negative a production mold or number of production molds are made.

As related above, silicone rubber is the most desirable material for making the master mold—it is to be understood, however, that other materials may be employed, the criterion being that the material must have a lower dielectric constant than the sheet thermoplastic of which the part is to be reproduced. Materials which may be employed in lieu of silicone rubber are polyurethane and polysulfide rubber. The chief advantages of silicone rubber in carrying out the process herein described is that it will not stick to anything but itself and hence there is no problem with sticking of the silicone rubber to the mat and/or to the master pattern. Other advantages provided by silicone rubber are good detail, room-temperature curing and the desired dielectric characteristics.

An apparatus for carrying out the procedures related above wherein the master pattern is embedded in a plaster of Paris backing mat or in a plastic backing mat is shown in FIG. 16 comprising a supporting frame 41 mounting a clamping ring 43 between which the fabric sheet or the plastic sheet is adapted to be clamped and supported across a top opening 42. When the backing mat is to be comprised of plastic, a heating grid 46 is supported by means of a bracket 44 above the clamping ring so that it may be swung from an out of the way position to a position above the clamping ring and comprises radiant heating elements 48 which when energized will by radiation soften the plastic sheet. Within the supporting frame there is mounted a fluid cylinder 50 provided with a ram 52 at the upper end of which there is a platen 54 containing a vacuum chamber 56, the upper side of which contains transverse longitudinal channels 58 connected by an opening 60 to the interior of the chamber. A flexible conductor 62 is connected to the lower side of the chamber to apply vacuum to the interior.

With this equipment the initial step comprises placing the flat metal plate 18 on the surface of the platen so that the holes therein are in communication with one or more of the channels 58. The sheet 16 of resilient material is now placed face down on the metal plate and this comprises preferably a sheet of split chrome leather, although other kinds of sheet material may be employed, for example, felt or rubber. The master pattern 10 is now placed face down on the resilient sheet 16 and then the mask 22 is placed over the master pattern—the mask as previously related being of a thickness which is equal to the depth of the mold cavity to be made and this is slightly less than the thickness of the thermoplastic material which is to be molded. The mask 22 may be comprised of metal or of a plastic material which does not become plastic at the temperature employed in softening the plastic sheet when the latter is used to form the backing mat.

When making the mat, if the mat is comprised of plaster of Paris, the platen 54 is raised to bring the master pattern into engagement with the flexible imprevious sheet 26 whereupon a vacuum is applied to the vacuum chamber through the conductor 62. The vacuum draws the flexible impervious sheet into intimate contact with the rear side of the master pattern and about the peripheral edge thereof against the mask and about the edges of the resilient sheet 16 and plate 18 into engagement with the supporting platen 54 forming a surrounding wall 27 and flange 29, the wall defining a cavity, the depth of which from the face of the master pattern corresponding to the thickness of the plate 18 and resilient material 16. At this point and while maintaining the vacuum, a ring 55 is placed about the assembly as shown in FIG. 4 whereupon plaster of Paris is poured into the ring over the exposed rear surface of the flexible impervious sheet to form a layer of greater thickness than the rearwardly displaced portion of the master pattern and allowed to harden. As previously indicated, an adhesive may be applied to the back of the master pattern and also the back of the flexible impervious sheet. Following hardening of the plaster of Paris, the ring 55 is removed, the clamping ring 43 is released and the rigid plaster of Paris mat with the master pattern embedded therein removed. The plaster of Paris mat may now be employed, as previously described, to make the master silicone mold of FIG. 7.

When the mat is to be comprised of sheet plastic material the same procedure is followed as to assembling the parts on the platen. However, in this instance the grid 46 is swung to a position above the plastic sheet to soften it whereupon the platen is raised to bring the master pattern into engagement with the softened sheet and the vacuum applied. As soon as the plastic sheet has been conformed to the rear side of the master pattern and drawn about the edges of the resilient sheet and the plate into engagement with the supporting platen by the vacuum, the heater is swung to an out of the way position and water is sprayed over the surface of the sheet plastic to cool it and cause it to become rigid. Other means could be used, for example, a blast of refrigerated air. When the sheet plastic is completely rigid, the vacuum is released, the platen lowered and the rigid plastic backing sheet with the master pattern and mask embedded in it unclamped and removed. The mask is now removed leaving the master pattern projecting from the surface of the surrounding plastic backing sheet which now becomes a supporting mat. As previously indicated, a suitable adhesive is applied to the rear side of the master pattern before it is brought into engagement with the softened plastic sheet.

It is usually desirable to trim off the portion of the plastic sheet which was held between the clamping means 43 after the sheet is removed because softening and re-rigidifying produces stresses and strains in the plastic sheet which tend to cause the mat to become distorted and not to lie perfectly flat.

Following trimming the supporting mat with the master pattern embedded in it is supported by the flange 29 across a rigid frame 64, the latter in turn being supported by a plate 65 as shown in FIG. 17. The plate 65 is supported on legs 70 and has threaded through its bottom a plurality of adjustable shim screws 72. A ring 76 is clamped down on the flange by clamping elements 74 and to make sure that the surface of the master pattern is perfectly level, a rigid bar 78 is placed across the ring 76 and a dial indicator 80 is mounted thereon for movement across the master pattern to determine the level. The bar 78 may be moved about both transversely and longitudinally of the ring to test the flatness of the entire area. The shim screws 72 are accessible from the lower side of the plate and by adjustment, as indicated by the dial reading, enable bringing the entire surface into a substantially common plane.

Having leveled the master pattern, a curable liquid material having a lower dielectric constant than the thermoplastic of which the part is to be made, for example, room-temperature curing silicone rubber, is poured onto the mat (FIG. 18) to flood the surface of the master pattern and the surrounding mat to a depth corresponding to the depth of the cavity within the surrounding wall 27. The plate 32 is clamped across the flange at the open top of the mat to constrain the silicone rubber while curing takes place and preferably contains one or more holes 34 to allow for escape of excess material during the curing process. As soon as the curing takes place the clamping ring is removed and any excess material which extrudes through the holes trimmed off, whereupon the cured silicone rubber is stripped from the master pattern. The nubs formed within the holes are now trimmed off the back and the resulting structure comprises the master mold of FIG. 7.

The vacuum process related above makes it possible to reproduce shoe uppers prepared in the shoe factory in conventional fashion without need for careful selection of stock, splitting, skiving and like operations since it is independent of the thickness of the material of the master pattern.

While the foregoing procedures are the most expedient there are alternatives. Thus, for example, as shown in FIG. 19, the master pattern 10a may be placed face side up on a sheet of wax 88, for example, carnauba wax or similar impressionable material and pressed into the face of the wax sheet as shown in FIG. 20, so as to displace the edges of the part 12 into the sheet and to bring the parts 14—14 into the plane of the part 12 between them. A suitable adhesive is used to cause the parts to adhere firmly to the wax, the latter, of course, being of sufficient rigidity to hold the parts in a substantially flat plane. The face of the master pattern projects from the wax sheet an amount corresponding substantially to the depth of the mold to be made and the surrounding portion of the wax sheet comprises a supporting mat. The composite structure comprising the master pattern and its supporting mat is supported on a flat surface within a ring and the mat and surface of the master pattern are flooded with a curable liquid material having a lower dielectric constant than that of the thermoplastic of which the part is to be made, preferably room-temperature curing silicone rubber. While the silicone rubber is curing it is confined within the ring by a rigid plate to provide for a uniform predetermined depth. When the silicone rubber is cured it is stripped from the master pattern and the mat and comprises the master mold.

Another alternative is to employ, instead of a single layer of wax 88, a number of strips of wax 90 and to build up the back of the master pattern as shown, for example, in FIG. 21, by filling the recesses 92, 94 and 96 at the back side with such strips to form a substantially flat back and then supporting the composite structure within a ring to make the mold in the same fashion described with references to FIGS. 19 and 20.

Molds made according to the methods described above provide for extremely fine reproduction since no part of the cavity within which a part is to be molded is deeper than the thickness of the part being molded and so the molding pressure when applied is sure to cause conformance of the part to the configuration of the mold. It is to be observed that the method herein described has the advantage that it can be employed to produce a mold with a cavity of a predetermined depth independently of the thickness or differences in thickness of the master pattern and to produce a mold, the bottom of which beneath the mold surface is uniformly thickened so as to afford uniform dielectric properties during molding. It is also to be noted that by providing all molds with the same bottom thickness the need for adjusting the high frequency generator for each molding operation is eliminated.

It should be understood that the present disclosure is for the purpose of illustration only and that this invention includes all modifications and equivalents falling within the scope of the appended claims.

We claim:

1. The method of making a mold for reproducing from a master pattern having different surface elevations a part comprised of thermoplastic sheet material of uniform thickness simulating the master pattern; comprising providing a master pattern of said part to be reproduced, positioning the master pattern on a support within a mask with its back side in engagement with a substantially impervious softened sheet of normally rigid plastic of larger area than said master pattern and surrounding mask such that said impervious plastic sheet extends beyond the peripheral edge of the mask, applying a vacuum to the face of the master pattern, surrounding mask and sheet through said support so as to displace the raised portions at the face of the master pattern into a common plane with the face, to displace the master pattern and mask rearwardly into said softened sheet of plastic and to draw said softened sheet forwardly about the peripheral edge of the mask to form a forwardly projecting rim defining a cavity surrounding the mask and master pattern, restoring said softened sheet of plastic to its rigid state thereby to fix the embedded portion of the master pattern within said sheet, stripping the mask from around the master pattern, leaving a portion of the master pattern projecting from said plastic sheet which corresponds to the thickness of the mask, flooding the cavity with a curable liquid material having a lower dielectric constant than the thermoplastic material of said part to be made to a depth exceeding the projecting portion of the master pattern, curing the liquid material and stripping the cured material from the master pattern and from said rigid sheet.

2. A method according to claim 1, comprising softening the plastic sheet by application of heat thereto.

3. A method according to claim 2, comprising restoring the sotfened plastic sheet to its rigid condition by spraying water thereon.

4. A method according to claim 3, comprising confining the liquid material to a controlled thickness while curing.

5. The method of making a mold for reproducing from a master pattern having different surface elevations a part comprised of thermoplastic sheet material of uniform thickness simulating the master pattern; comprising providing a master pattern of the part to be reproduced, positioning the master pattern within a mask on a supporting surface, displacing the elevated portions at the face of the master pattern into a common plane, forming a rigid structure across the back and about the sides of the mask such that said rigid structure extends forwardly of the face of the master pattern and surrounding mask forming a cavity, removing the mask from the rigid structure such that the master pattern projects from the rigid structure by an amount corresponding to the thickness of the mask, flooding the cavity with a curable liquid material having a lower dielectric constant than the thermoplastic of which said part is to be reproduced to a predetermined depth which is greater than the thickness of the projecting portion of the master pattern, causing the liquid material to cure and then stripping the cured material representing the mold from the rigid structure.

6. A method according to claim 5, comprising applying adhesive to the back side of the master pattern prior to forming said rigid structure.

7. A method of making a mold for reproducing from a master pattern having different surface elevations, a part comprised of thermoplastic sheet material of uniform thickness simulating the master pattern; comprising providing a master pattern of the part to be reproduced, positioning the master pattern within a mask on a supporting surface, displacing the elevated portions at the face of the master pattern into a common plane, flooding the back of the master pattern and the surrounding mask with a curable liquid material to form a rigid structure having forwardly facing rim defining a cavity surrounding the mask and the master pattern, removing the mask from around the master pattern, leaving the master pattern projecting from the rigid structure by an amount corresponding to the thickness of the mask, flooding the cavity with a curable liquid material having a lower dielectric constant than the thermoplastic of which the part is to be reproduced to a predetermined depth which is greater than the thickness of the projecting portion of the master pattern, causing the liquid material to cure and then stripping the cured material representing the mold from the rigid structure.

8. The method of making a mold for reproducing from a master pattern having different surface elevations, a part comprised of thermoplastic sheet material of uniform thickness simulating the master pattern; comprising providing a master pattern of the part to be reproduced, positioning the master pattern in a mask which is of lesser thickness than the master pattern by an amount corresponding to the thickness of the part to be reproduced, displacing the elevated portions at the face of the master pattern rearwardly with respect to the mask such as to dispose the elevated portions at the face in a common plane with the face of the mask forming a rigid structure across the back surface of the master pattern and mask and forwardly about the edges of the mask to provide a surrounding flange extending forwardly from the face of the mask and the master pattern defining a cavity about the master pattern, removing the mask, leaving the master pattern projecting forwardly from the rigid structure, flooding the cavity with a curable liquid material having a lower dielectric constant than the thermoplastic of which the part is to be reproduced to a predetermined depth which is greater than the thickness of the projecting portion of the master pattern, causing the liquid material to cure and then stripping the cured material representing the mold from the rigid structure.

9. The method of making a mold for reproducing from a master pattern having different surface elevations a part comprised of thermoplastic sheet material of uniform thickness simulating the master pattern; comprising providing a master pattern of the part to be reproduced, positioning the master pattern within a mask on a rigid supporting surface with a resilient layer of sheet material between the master pattern, mask and supporting surface, displacing the elevated portions at the face of the master pattern rearwardly from the face of the master pattern and the mask to thus displace the elevated portions at the face of the master pattern into a common plane with the face of the mask, forming a rigid structure across the back side of the master pattern and mask and forwardly about the edges of the mask such that said forwardly extending portions of said structure define a cavity around the mask and the master pattern, removing the mask from the structure, leaving the master pattern projecting therefrom, flooding the cavity with a curable liquid material having a lower dielectric constant than the thermoplastic of which the part is to be reproduced to a predetermined depth which is greater than the thickness of the projecting portion of the master pattern, causing the liquid material to cure and then stripping the cured material representing the mold from the rigid structure.

10. A method of making a mold for reproducing from a master pattern having different surface elevations, a part comprised of thermoplastic sheet material of uniform thickness simulating the master pattern; comprising providing a master pattern of said part to be reproduced, positioning the master pattern on a support within a mask with its back side engaged with a sheet of flexible impervious material of larger area than said part so that it extends beyond the peripheral edge of the mask, applying a vacuum to the face of the master pattern, mask and impervious sheet through said support to effect displacement of the raised portions at the face of the master pattern rearwardly to the back side into said flexible impervious sheet and to draw the impervious flexible sheet forwardly about the peripheral edge of the mask to form a forwardly projecting rib defining a cavity surrounding the mask and the master pattern, holding the mask and master pattern embedded in said sheet of flexible impervious material, applying a liquid layer of quick-setting material to the back side of said sheet of flexible impervious material, causing said quick-setting material to harden to provide a rigid supporting structure for the master pattern, stripping the mask from around the master pattern, leaving a portion of the master pattern projecting from the supporting structure which corresponds in thickness to the thickness of the mask, flooding the cavity with a curable liquid material having a lower dielectric constant than the thermoplastic of which said part is to be reproduced to a predetermined depth which is greater than the thickness of the projecting portion of the master pattern, curing the liquid material and then stripping the cured material representing the mold from the structure.

11. A method according to claim 10, comprising applying adhesive to the back side of the master pattern prior to embedding it in said sheet of flexible impervious material.

12. A method according to claim 10, comprising employing as said quick-setting material plaster of Paris.

References Cited

FOREIGN PATENTS

| | | | |
|---|---|---|---|
| 1,373,121 | 3/1921 | Emery | 264—225 X |
| 1,792,486 | 2/1931 | Feinberg | 264—227 X |
| 3,221,654 | 12/1965 | Jernt | 264—89 X |
| 3,247,550 | 4/1966 | Haines, Jr. | 264—89 X |
| 3,382,125 | 5/1968 | Lowdermilk, Jr. | 264—90 X |
| 3,505,443 | 4/1970 | Friesner | 264—92 |
| 3,445,873 | 5/1969 | Staden | 12—146 C |
| 3,562,049 | 2/1971 | Maher | 264—227 X |
| 3,641,603 | 2/1972 | Lockwood | 12—146 C |

FOREIGN PATENTS

| | | | |
|---|---|---|---|
| 899,646 | 6/1962 | Great Britain | 264—92 |

DONALD J. ARNOLD, Primary Examiner

A. M. SOKAL, Assistant Examiner

U.S. Cl. X.R.

264—92, 220, 226; 249—117